Patented Aug. 14, 1934

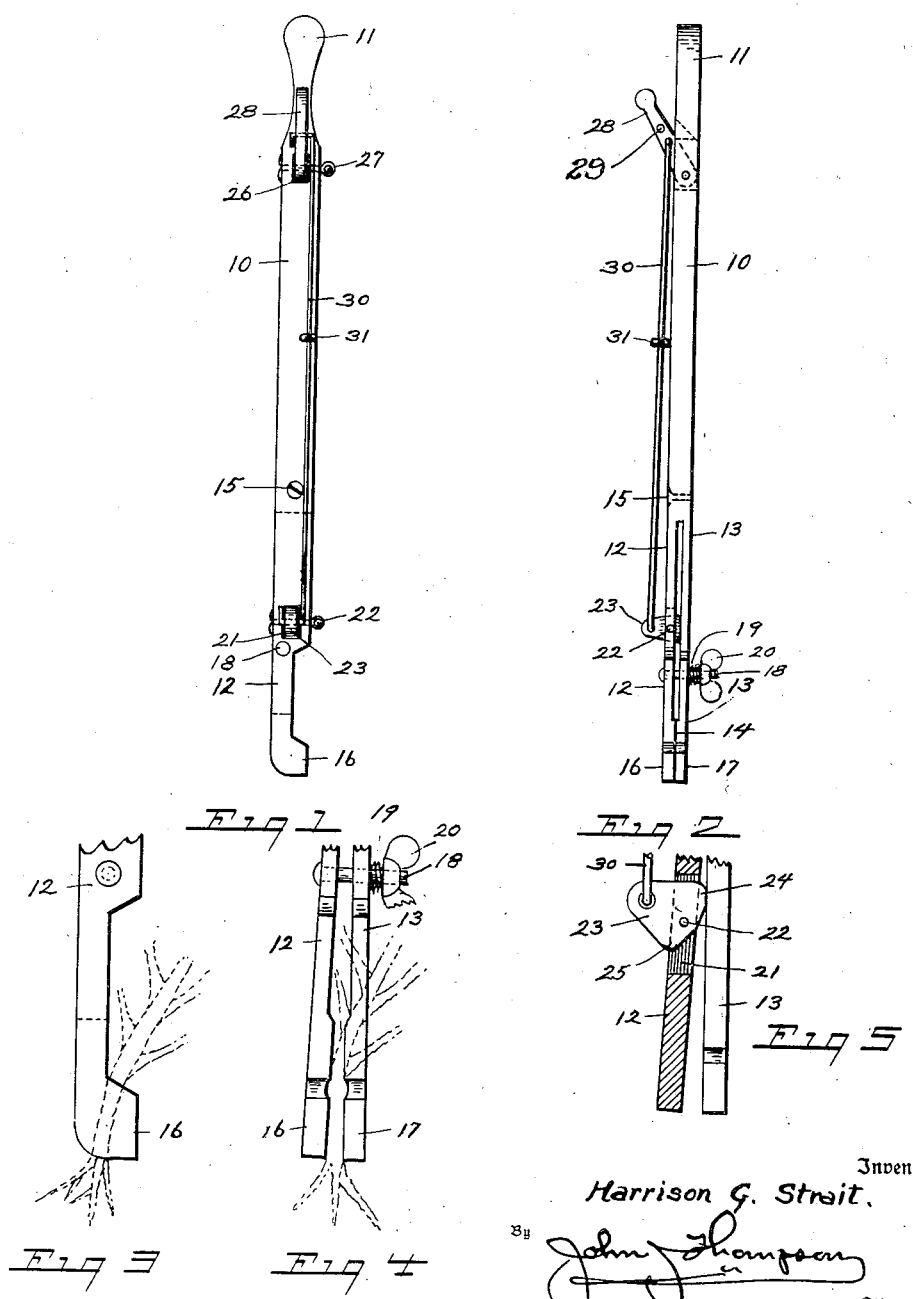

1,970,108

UNITED STATES PATENT OFFICE 1,970,108

PLANTING IMPLEMENT

Harrison G. Strait, Hyde Park, N. Y.

Application December 16, 1933, Serial No. 702,656

5 Claims. (Cl. 55—18)

This invention relates to a planting implement of the hand operated type, and more particularly to a tool for use in transplanting small plants such as trees in reforesting where a great number of plants have to be planted.

The object of the invention is to provide an implement that shall be light, strong and simple of operation, and which may be operated without bending over on the part of the operator.

Another object of the invention is to provide an implement which will plant the trees in such a manner as to avoid root congestion, frost heaving and turned up roots.

Another object of the invention is to provide an implement that may be adjusted to hold trees or plants of several different sizes.

Another object of the invention is to provide in a tool of this kind, means for adjusting the gripping tension on the plant, and means for removing dirt from the gripping jaws.

Another object of the invention to provide means whereby the plant or tree is held by its stem and not either by its roots or leaves, so that the plant cannot be damaged in any way through planting.

With these and other objects in view, my invention consists in certain novel construction and combination of parts as will hereinafter be fully described and claimed, and also illustrated in the accompanying drawing which forms a part hereof and in which like figures of reference to corresponding parts in all of the views, but it is understood that slight changes may be made in the same without departing from the spirit of the invention.

In the drawing:

Figure 1, shows a side elevation of the device.

Figure 2, shows a front view of the same.

Figure 3, is an enlarged partial view of the jaws showing a plant held therein in position for planting.

Figure 4, is a front view of the same, showing the position of the jaws.

Figure 5, is an enlarged sectional view, showing the spreading cam and the operation of the same.

While I have here shown and described the device as being constructed of wood and metal, it is understood that the same may be made entirely of metal if desired, and it may be in the form of a casting, or sheet metal formed into the required shape; also the device may be made in any size and proportion suitable for the use to which it is intended.

Referring to the drawing:

The implement comprises a bar 10 either rectangular or round in cross section and formed at the upper end with a handle 11.

The lower end of the bar 10 is divided into two members 12 and 13 by a slot or cut 14 that is open on the lower end and the back and front; and these two members are prevented from splitting apart where they join by a screw or bolt 15 which reinforces and holds the bar 10 from further parting action.

The front of the bar 10 adjacent the lower end is formed with a cut-out portion which in its turn forms a pair of jaws 16 and 17 which normally are held in a closed position due to the natural spring of the wood of the bar, and by the action of a tension device which comprises a bolt 18 mounted tightly in the member 12, and loosely in the member 13, and has mounted thereon a spring 19 and wing nut 20 by which the tension between the jaws 16 and 17 may be adjusted.

For spreading or opening the jaws 16 and 17 against the natural spring of the wood of the bar 10 and the tension device, the member 12 is formed with an orifice 21 within which is pivoted upon the cotter pin 22 a cam lever 23, which is reversible and formed with a long cam 24 and a short cam 25, so that by removing the pin 22 and reversing the cam lever 23 the members 16 and 17 and the jaws may be made either to open to hold small or larger plant stems.

The cam 23 may also be removed in this manner for renewal should it be necessary.

Near the handle 11 is formed in the bar 10 another orifice or opening 26, within which is pivoted on the cotter pin 27 a hand lever 28; this hand lever 28 being provided with a series of spaced holes 29 for the reception of one end of a connecting rod 30, which is formed with two hooked ends; one for engagement with the cam 23 and the other for engagement with any one of the holes 29 depending upon the leverage that is desired; the rod 30 is guided and held in place by an eye 31 secured to the bar 10.

In the operation of the device:

The handle 11 is held in the right hand with the fingers on the hand lever 28, and by closing the hand the hand lever 28 is depressed pulling on the rod 30 and operating the cam 23 to open the jaws 16 and 17, at which time the operator places with his left hand a plant within the jaws 16 and 17 with the roots extending from the lower end of the bar 10 and the branches extending upward in the cut out portion.

The helper having made the proper hole in the ground with a mattock, inserting the same to the depth of about 6 inches and pulling the mattock back for about about one inch to allow the planting implement and plant to be inserted in the hole, the implement with the tree or plant is inserted to the bottom of the mattock hole, thus insuring that all of the roots enter the hole; the plant is then pushed well over to the left side of the hole and the implement is raised until the proper depth is reached; the operator presses with his foot upon the ground around the hole to hold the plant and the implement is released and drawn up, and the same operation repeated for each plant.

Having thus described my invention, what I claim as new and desire to secure by Letters Patents, is:

1. A planting implement comprising a bar, a handle formed on one end thereof, the other end of said bar formed with a longitudinal slot adapted to receive the stem of a plant, means for closing the slotted end of the bar upon the stem of the plant, and means for opening said slot to release the plant therefrom.

2. A planting implement comprising a bar formed with a handle on one end thereof, the other end formed with a slot open on the end and sides and extending up said rod for a portion of its length, the upper portion of said slot of greater width than the lower portion to form a pair of stem gripping jaws, a cut out portion at right angles to said slot adapted to receive the plant, means for normally retaining the jaws in a gripping position, and means for adjusting the tension thereof.

3. A planting implement comprising a bar formed on one end with a handle, the other end of said bar divided into two jaws by a slot open on the sides and end, said slotted end formed with a cut-out portion on one side thereof, means for normally retaining said jaws in closed relation, and means for spreading said jaws to release a plant held thereby.

4. A transplanting implement comprising a bar having a handle on one end thereof, parallel members formed on the other end of said bar, plant stem gripping jaws formed on said parallel members adjacent the ends thereof, means for placing an adjustable tension upon said parallel members, means mounted in said bar for forcing said parallel members apart against the action of said tension means, and means mounted in said bar for operating such spreading means.

5. A transplanting implement for planting small plants comprising a bar formed with a handle, the lower end of said bar divided by a slot into two parallel members formed with plant stem gripping means, a cam lever pivoted in one of said members and bearing against the other member to force the same apart, a hand lever pivoted in said bar adjacent the handle end, and a rod pivoted both to the cam lever and the hand lever for operating the cam lever by the movement of the hand lever.

HARRISON G. STRAIT.